(12) United States Patent
Lam et al.

(10) Patent No.: US 10,992,387 B2
(45) Date of Patent: Apr. 27, 2021

(54) PORT REPLICATOR

(71) Applicant: Google LLC, Mountain View, CA (US)

(72) Inventors: Cedric Fung Lam, San Carlos, CA (US); Xiangjun Zhao, Fremont, CA (US); Shuang Yin, Sunnyvale, CA (US); Muthu Nagarajan, Santa Clara, CA (US); Tao Zhang, Mountain View, CA (US); Liang Du, Santa Clara, CA (US); Adam Edwin Taylor Barratt, Portland, OR (US); Changhong Joy Jiang, Dublin, CA (US); Claudio Desanti, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/568,759

(22) Filed: Sep. 12, 2019

(65) Prior Publication Data
US 2021/0083770 A1 Mar. 18, 2021

(51) Int. Cl.
*H04B 10/29* (2013.01)
*H04B 10/25* (2013.01)
(Continued)

(52) U.S. Cl.
CPC ....... *H04B 10/25891* (2020.05); *H04B 10/27* (2013.01); *H04B 10/503* (2013.01); *H04B 10/69* (2013.01)

(58) Field of Classification Search
CPC .. H04B 10/25891; H04B 10/27; H04B 10/69; H04B 10/503
See application file for complete search history.

(56) References Cited

U.S. PATENT DOCUMENTS

| | | | |
|---|---|---|---|
| 6,954,593 B1 * | 10/2005 | Fuse | H04B 10/505 398/154 |
| 7,660,528 B2 | 2/2010 | Hirth et al. | |
| (Continued) | | | |

FOREIGN PATENT DOCUMENTS

EP 2285019 A4 3/2012

*Primary Examiner* — Tanya T Motsinger
(74) *Attorney, Agent, or Firm* — Honigman LLP; Brett A. Krueger

(57) ABSTRACT

A method of combining optical signals from a plurality of optical fibers into a single optical signal includes receiving, at corresponding optical-signal receivers optically coupled to corresponding trunk fibers, respective optical signals. The method further includes determining, by the corresponding optical-signal receivers, when each respective optical signal is received. When the respective optical signal is received, the method includes performing the following steps: converting, by the corresponding optical-signal receiver, the respective optical signal to a corresponding electrical signal; transmitting, by the corresponding optical-signal receiver, the corresponding electrical signal to a corresponding input channel of an electrical-multiplexing device; and configuring the electrical-multiplexing device to select the corresponding input channel. Configuring the electrical-multiplexing device to select the corresponding input channel causes the electrical-multiplexing device to transmit the corresponding electrical signal to an electro-optical converter configured to convert the corresponding electrical signal back to the respective optical signal.

16 Claims, 11 Drawing Sheets

(51) Int. Cl.
*H04B 10/27* (2013.01)
*H04B 10/50* (2013.01)
*H04B 10/69* (2013.01)

(56) References Cited

U.S. PATENT DOCUMENTS

| | | | |
|---|---|---|---|
| 8,472,804 B2 | 6/2013 | Trojer | |
| 8,532,487 B2 | 9/2013 | Boyd et al. | |
| 9,699,532 B2 | 7/2017 | Dai | |
| 9,762,349 B1* | 9/2017 | Dai | H04J 14/08 |
| 2006/0120724 A1* | 6/2006 | Ishimura | H04J 14/0247 |
| | | | 398/75 |
| 2007/0154217 A1* | 7/2007 | Kim | H04J 14/02 |
| | | | 398/72 |
| 2010/0098412 A1* | 4/2010 | Boyd | H04J 14/0282 |
| | | | 398/25 |
| 2010/0135665 A1* | 6/2010 | Lee | H04B 10/29 |
| | | | 398/99 |
| 2010/0321072 A1* | 12/2010 | Bauwelinck | H04L 25/062 |
| | | | 327/142 |
| 2011/0135306 A1* | 6/2011 | Kim | H04J 14/0246 |
| | | | 398/68 |
| 2012/0163802 A1* | 6/2012 | Kim | H04B 10/07 |
| | | | 398/17 |
| 2012/0251108 A1* | 10/2012 | Chen | H04J 14/0282 |
| | | | 398/49 |
| 2014/0186023 A1* | 7/2014 | Louderback | H04B 10/071 |
| | | | 398/16 |
| 2014/0314414 A1* | 10/2014 | Cheng | H04J 14/0282 |
| | | | 398/68 |
| 2015/0071637 A1* | 3/2015 | Deng | H04Q 11/0066 |
| | | | 398/52 |
| 2015/0104179 A1* | 4/2015 | Wang | H04J 14/0282 |
| | | | 398/81 |
| 2016/0248534 A1* | 8/2016 | Kuang | H04B 10/503 |
| 2016/0344472 A1* | 11/2016 | Geng | H04J 14/0295 |
| 2017/0134113 A1* | 5/2017 | Lam | H04J 14/08 |
| 2018/0175935 A1* | 6/2018 | Du | H04J 14/025 |
| 2019/0074910 A1* | 3/2019 | Seo | H04B 10/69 |

\* cited by examiner

PORT REPLICATOR

TECHNICAL FIELD

This disclosure relates to an Optical Line Terminal (OLT) port replicator.

BACKGROUND

Fiber optic communication is an emerging technique for transmitting information from a source (transmitter) to a destination (receiver) using optical fibers as the communication channel. Fiber optic communications allow for the transmission of data over longer distances and at higher bandwidth than other forms of communications. Companies use optical fibers to transmit telephone signals, internet communication, and cable television signals. A passive optical network (PON) is a telecommunications technology used to provide fiber to the end consumer. A PON's distinguishing feature is that it implements a point-to-multipoint architecture, in which unpowered fiber optic splitters are used to enable a single optical fiber to serve multiple end-points. Passive optical networks are often referred to as the "last mile" between an Internet Service Provider (ISP) and customer.

A PON includes an optical line terminal (OLT) at the service provider's central office (hub) and a number of optical network units (ONUs) or optical network terminals (ONTs) near end users. A PON reduces the amount of fiber and central office equipment required compared with point-to-point architectures. In most cases, downstream signals (i.e., from OLT to ONU) are broadcast to all premises sharing multiple fibers. Upstream signals (i.e., from ONU to OLT) are combined using a multiple access protocol, usually time division multiple access (TDMA). Due to the topology of a PON, the transmission modes for downstream and upstream are different. For downstream transmission, the OLT broadcasts optical signal to all ONUs in continuous mode (CM). However, the use of CM by ONUs may result in the optical signals transmitted from the ONUs overlapping. Therefore, burst mode (BM) transmission is typically used for upstream channels. BM transmission mode requires the optical transmitter to turn on and off in a short time period. In BM, an ONU transmits optical packets when it is allocated a time slot and it has data to transmit.

SUMMARY

One aspect of the disclosure provides a method of combining optical signals from a plurality of optical fibers into a single optical signal. The method includes receiving, at corresponding optical-signal receivers, optically coupled to corresponding trunk fibers, respective optical signals. The method further includes determining, by the corresponding optical-signal receivers, when each respective optical signal is received. When the respective optical signal is received, the method includes: converting, by the corresponding optical-signal receiver, the respective optical signal to a corresponding electrical signal; transmitting, by the corresponding optical-signal receiver, the corresponding electrical signal to a corresponding input channel of an electrical-multiplexing device; and configuring the electrical-multiplexing device to select the corresponding input channel. Configuring the electrical-multiplexing device to select the corresponding input channel causes the electrical-multiplexing device to transmit the corresponding electrical signal to an electro-optical converter configured to convert the corresponding electrical signal back to the respective optical signal.

Implementations of the disclosure may include one or more of the following optional features. In some implementations, the corresponding optical-signal receiver includes a photodiode optically coupled to a corresponding trunk fiber, a trans-impedance amplifier in communication with the photodiode, and a burst-mode limiting amplifier in communication with the trans-impedance amplifier. In these implementations, the photodiode converts the respective optical signal to a respective current signal, the trans-impedance amplifier converts the respective current signal to the corresponding electrical signal, and the burst-mode limiting amplifier indicates when the respective optical signal is received. The photodiode may include an Avalanche Photodiode (APD) or a PIN diode.

In some examples, responsive to determining when the respective optical signal is received, the burst-mode limiting amplifier delivers a signal to a signal-conditioning circuit, causing the signal-conditioning circuit to reset the trans-impedance amplifier. The signal-conditioning circuit may include a Complex Programmable Logic Device (CPLD) or a Field Programmable Gate Array (FPGA). In some implementations, configuring the electrical-multiplexing device to select the corresponding input channel includes delivering, by the corresponding optical-signal receiver, a signal detection indication to a channel-select circuit, causing the channel-select circuit to deliver a channel-select indication to the electrical-multiplexing device. Here, the channel-select indication identifies the corresponding input channel of the electrical-multiplexing device.

In some examples, the electro-optical converter includes a burst-mode laser transmitter and/or the burst-mode laser transmitter includes a Distributed Bragg Reflector (DBR) laser. The method may also include delivering, by the electro-optical converter, the respective optical signal to a port of an optical line terminal (OLT). In some implementations, the corresponding trunk fibers are optically coupled to respective burst-mode laser transmitters of respective Optical Network Units (ONUs).

Another aspect of the disclosure provides an optical-electrical-optical converter including an electrical-multiplexing device comprising one or more input channels and optical-signal receivers optically coupled to corresponding trunk fibers. In these implementations, each optical-signal receiver receives a respective optical signal from the corresponding trunk fiber and determines when the respective optical signal is received. When the respective optical signal is received, the optical-signal receiver converts the respective optical signal to a corresponding electrical signal, transmits the corresponding electrical signal to a corresponding input channel of the electrical-multiplexing device, and configures the electrical-multiplexing device to select the corresponding input channel. Configuring the electrical-multiplexing device to select the corresponding input channel causes the electrical-multiplexing device to transmit the corresponding electrical signal to an electro-optical converter. Here, the electro-optical converter converts the corresponding electrical signal back to the respective optical signal.

Implementations of the disclosure may include one or more of the following optional features. In some implementations, the corresponding optical-signal receiver includes a photodiode optically coupled to a corresponding trunk fiber, a trans-impedance amplifier in communication with the photodiode, and a burst-mode limiting amplifier in communication with the trans-impedance amplifier. In these implementations, the photodiode converts the respective optical signal to a respective current signal, the trans-impedance amplifier converts the respective current signal to the corresponding electrical signal, and the burst-mode limiting amplifier indicates when the respective optical signal is received. The photodiode may include an Avalanche Photodiode (APD) or a PIN diode.

In some examples, responsive to determining when the respective optical signal is received, the burst-mode limiting amplifier delivers a signal to a signal-conditioning circuit, causing the signal-conditioning circuit to reset the trans-impedance amplifier. The signal-conditioning circuit may include a Complex Programmable Logic Device (CPLD) or a Field Programmable Gate Array (FPGA). In some implementations, configuring the electrical-multiplexing device to select the corresponding input channel includes delivering, by the corresponding optical-signal receiver, a signal detection indication to a channel-select circuit, causing the channel-select circuit to deliver a channel-select indication to the electrical-multiplexing device. Here, the channel-select indication identifies the corresponding input channel of the electrical-multiplexing device.

In some examples, the electro-optical converter includes a burst-mode laser transmitter and/or the burst-mode laser transmitter includes a Distributed Bragg Reflector (DBR) laser. The method may also include delivering, by the electro-optical converter, the respective optical signal to a port of an optical line terminal (OLT). In some implementations, the corresponding trunk fibers are optically coupled to respective burst-mode laser transmitters of respective Optical Network Units (ONUs).

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The distinguishing feature of a Passive Optical Network (PON) is that it implements a point-to-multipoint architecture, in which unpowered fiber optic splitters are used to enable a single optical fiber to serve multiple end-points. Unpowered fiber optic splitters may be referred to as passive splitters. In a typical PON, one or more Optical Line Terminals (OLTs) are installed at the Central Office (CO) of an Internet Service Provider (ISP). An Optical Network Unit (ONU) is installed at each user site, remote from the ISP's CO. The OLT generally has a fixed number of ports. Each port is optically coupled to an Optical Distribution Network (ODN). The ODN may include a trunk fiber connecting the OLT port to a remote Optical Distribution Point (ODP) containing unpowered fiber optic splitters. The ODP may be referred to as a Remote Node (RN). The split signals are distributed to ONUs installed at user sites. The ONU typically includes a burst-mode laser to generate an optical signal transmitted back to the OLT. The number of users one OLT port serves depends on a number of factors. These factors may include, among others, the distance from the OLT to the ODP or RN, the configuration of the passive optical splitters, and the number of users associated with each ODP. Implementations herein are directed toward methods of combining optical signals from a plurality of optical fibers into a single optical signal. Implementations herein are further directed toward an optical-electrical-optical (O/E/O) converter capable of combining optical signals from a plurality of optical fibers into a single optical signal. In an example, the O/E/O converter is configured to reduce the number of OLT ports the ISP deploys in the CO by extending an OLT port across two or more trunk fibers optically coupled to two or more respective ODPs. Burst-mode optical signals transmitted on the two or more trunk fibers from the ONUs are combined in a single optical signal by the O/E/O converter. Implementations herein are further directed toward extending the reach of an OLT port by increasing or restoring the optical signal strength transmitted from the OLT port to a remote location. These and other implementations disclosed herein may also be used to implement and manage a PON supported by redundant OLT ports for increased reliability. Although implementations are described principally in conjunction with PONs, the implementations may be similarly used in conjunction with other optical communication systems as well.

Figure 1A:
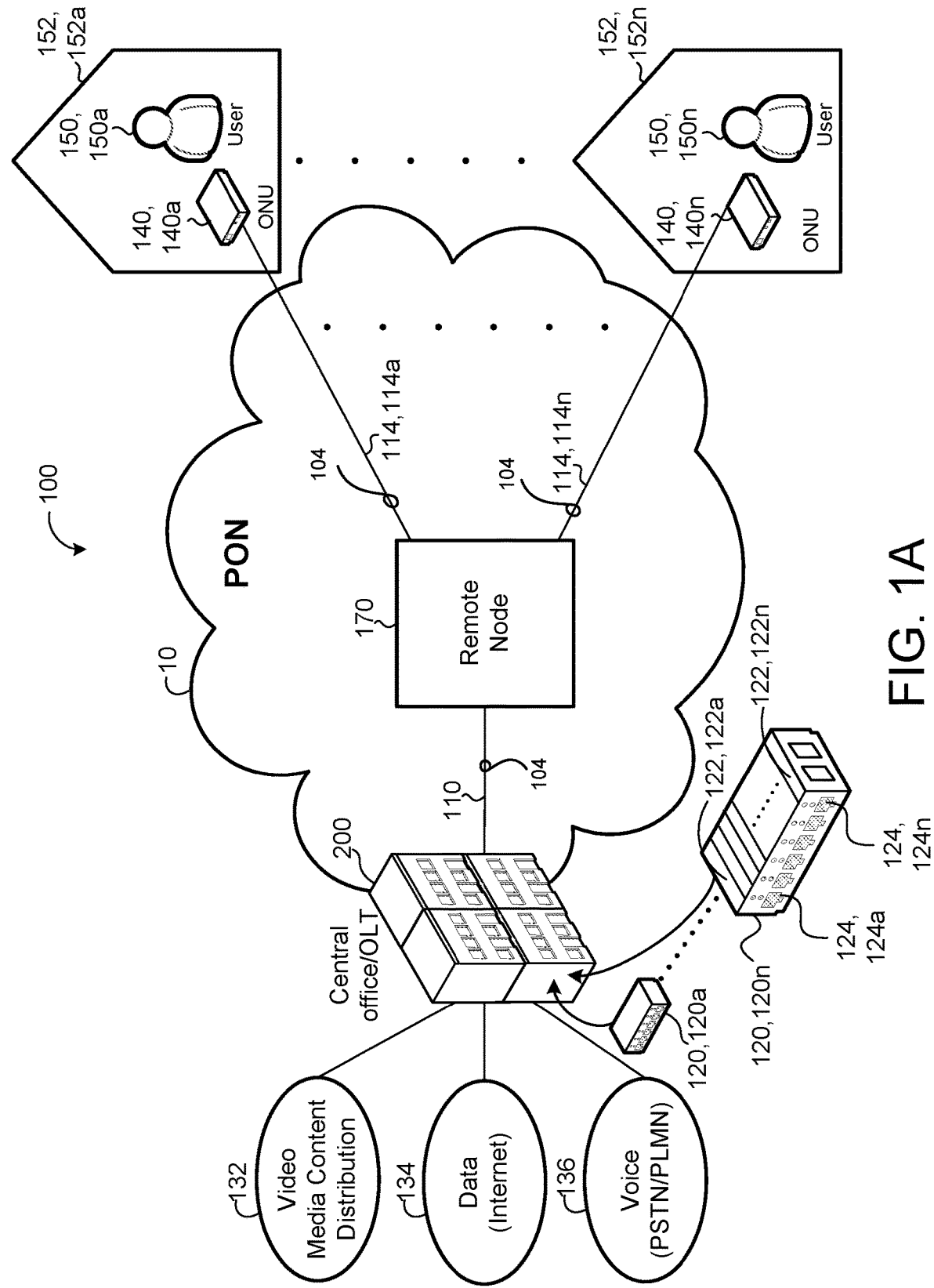
FIGS. 1A-1C are schematic views of example Passive Optical Network (PON) communication systems.
Figure 1B:
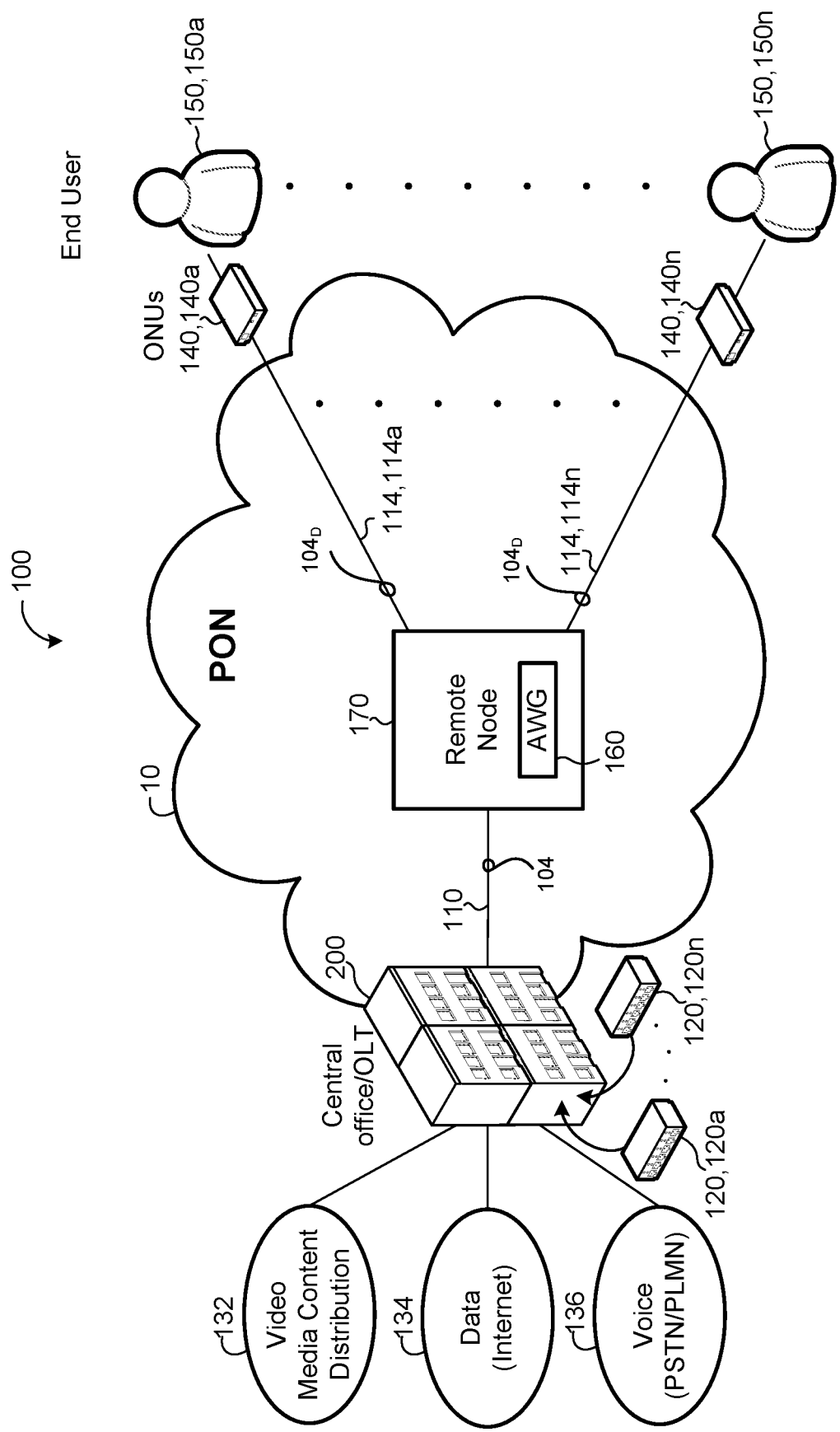
Figure 1C:
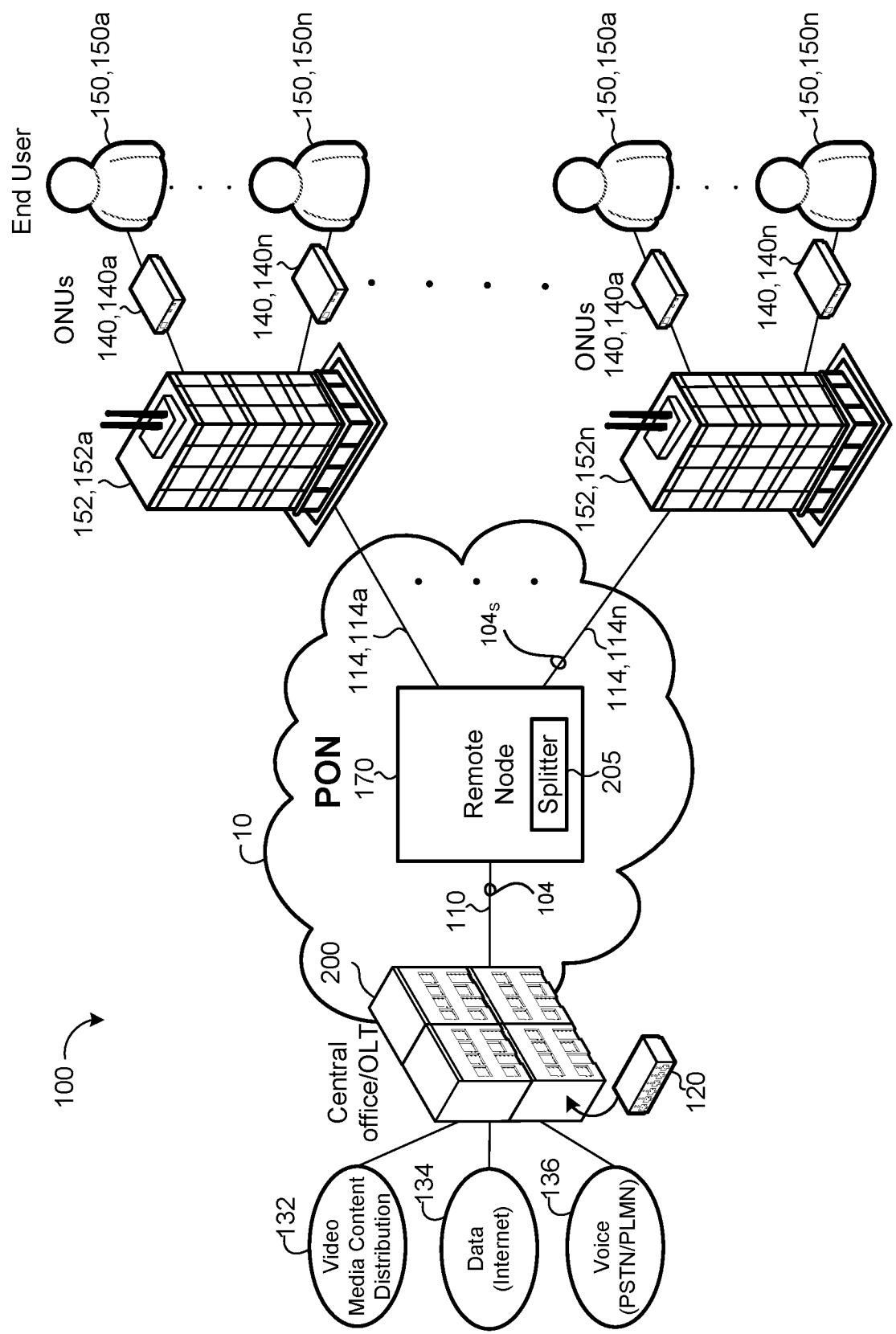
Figure 2:
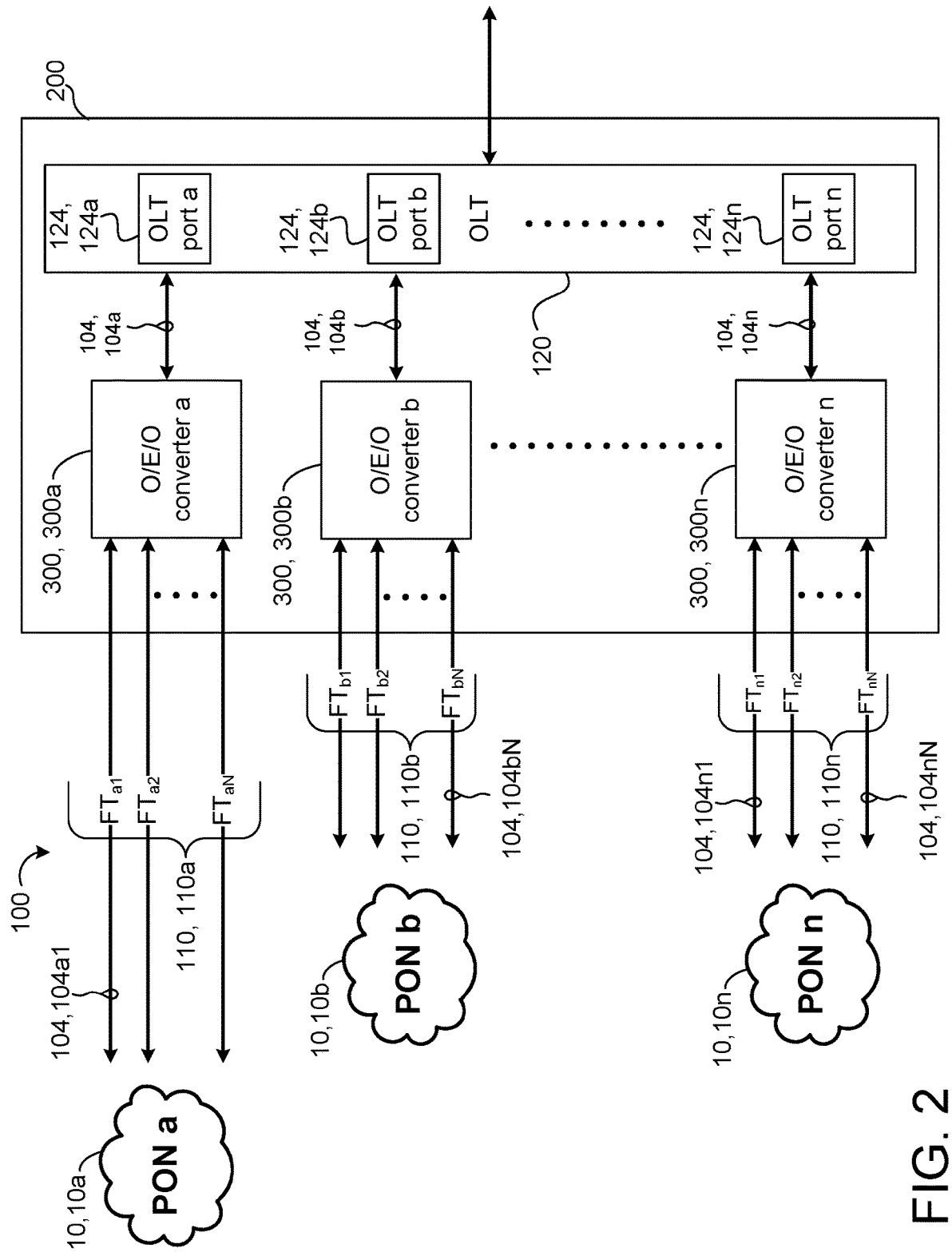
FIG. 2 is a schematic view of an example communication system including optical-electrical-optical (O/E/O) converters.

FIGS. 1A-1C depict example optical communication system 100 delivering communication signals 104 (e.g., optical signals) through communication links 110, 114, 114a-n (e.g., optical fibers or line-of-sight free space optical communications) between an optical line terminal (OLT) 120 housed in a central office (CO) 200 and optical network units (ONUs) 140, 140a-n (e.g., an optical transceiver) associated with users 150, 150a-n (also referred to as customers or subscribers). As shown in FIG. 2, the ONUs 140, 140a-n are typically located at premises 152, 152a-n of the users 150, 150a-n. Customer premises equipment (CPE) is any terminal and associated equipment located at the premises 152 of the user 150 and connected to a carrier telecommunication equipment at a demarcation point ("demarc"). The demarc is a point established in a house, building, or complex to separate customer equipment from service provider equipment (SPE). Some examples of CPE include telephones, routers, switches, residential gateways (RG), set-top boxes, fixed mobile convergence products, home networking adapters, or Internet access gateways that enable the user 150 to access services of a communications service provider and distribute them around the premises 152 of the user 150 via a local area network (LAN). In the examples shown, the ONU 140 is CPE.

In some implementations, the optical communication system 100 implements an optical access network, such as a passive optical network (PON) 10, for example, for access and mobile fronthaul/backhaul networks. Some examples of optical access networks include 10G-EPON, 10-Gigabit-capable PONs (XG-PONs), 10-Gigabit-capable symmetric PONs (XGS-PONs), Next Generation PONs (NG-PONs), and other PONs adhering to International Telecommunications Union (ITU) standards. In some examples, the optical communication system 100 implements a point-to-point (pt-2-pt) PON 10 having direct connections, such as optical Ethernets, where a home-run optical link 110 (e.g., fiber) extends all the way back to an OLT 120 at the CO 200 and each customer 150, 150a-n is terminated by a separate OLT 120a-n. In other examples, the optical communication system 100 implements a point-to-multi-point (pt-2-multi-pt) PON, where a shared OLT 120 services multiple customers 150, 150a-n. The CO 200 includes at least one OLT 120 connecting the optical access network to an Internet Protocol (IP), Asynchronous Transfer Mode (ATM), or Synchronous Optical Networking (SONET) backbone, for example. Therefore, each OLT 120 is an endpoint of the PON and converts between electrical signals used by service provider equipment and optical signals 104 used by the PON. As shown in FIG. 1A, each OLT 120, 120a-n includes at least one transceiver 122, 122a-n, depending on the implementation of the optical access network. The transceiver 122, 122a-n is optically coupled to a corresponding OLT port 124, 124a-n. The OLT 120 transmits the optical signal 104 via a corresponding port 124, through a corresponding feeder fiber 110 (e.g., fiber trunk 110) to a corresponding remote node (RN) 170.

Referring to FIG. 1B, the remote node 170 may include a band-multiplexer 160 configured to demultiplex the optical signal 104D and distribute demultiplexed optical signals 104D to multiple users 150, 150a-n along corresponding distribution fibers 114, 114a-n. The band-multiplexer 160 for multiplexing/demultiplexing may be an arrayed wavelength grating (AWG) 180, which is a passive optical device. In some examples, each CO 200 includes multiple OLTs 120, 120a-n, and each OLT 120 is configured to service a group of users 150. In addition, each OLT 120 may be configured to provide signals in different services. For instance, one OLT 120 provides services in XG-PON, while another OLT 120 provides services in NG-PON.

The CO 200 multiplexes signals received from several sources, such as a video media distribution source 132, an Internet data source 134, and a voice data source 136, and multiplexes the received signals into one optical signal 104 before transmitting the optical signal 104 to the RN 170 through the feeder fiber 110. The multiplexing may be performed by the OLT 120 or a broadband network gateway (BNG) positioned at the CO 200. Typically, services are time-division-multiplexed at the packet layer. Time-division-multiplexing (TDM) is a method of transmitting and receiving independent signals over a common signal path by using different, non-overlapping time slots. Wavelength division multiplexing (WDM) uses multiple wavelengths λ to implement point-to-multi-point communications in the PON 10. The OLT 120 serves multiple wavelengths through one fiber 110 to the band-multiplexer 160 at the RN 170, which multiplexes/demultiplexes signals between the OLT 120 and a plurality of ONUs 140, 140a-n. Multiplexing combines several input signals and outputs a combined signal. Time wavelength division multiplexing (TWDM) uses both time and wavelength dimensions to multiplex signals.

Referring to FIG. 1C, the user premises 152, 152n may be a Multi-Dwelling Unit (MDU), such as an apartment, condo, or student housing. MDUs are characterized a high density of users. Service providers recognize the rich potential returns on a fiber investment in MDU environments. In some examples, the optical communication system 100 includes multiple optical transmitter/receiver or transceiver systems 120. In the example shown, one trunk fiber 110 sends a corresponding optical signal 104 from a corresponding OLT port 124 at the CO 200 to a corresponding remote node 170, where a splitter 205 splits the optical signal 104 and distributes the split optical signal 104s to many different MDUs 152, 152a-n via fiber feeders 114, 114a-n. Thereafter, each MDU 152 splits the signal 104s received by the corresponding fiber feeder 114 and distributes the signal to many ONUs 140, 140a-n. The number of users 150 one OLT port 124 serves depends on a number of factors that include, without limitation, a distance between the OLT 120 and the RN 170 and the configuration of the passive optical splitter 205. The strength of the optical signal 104 may be attenuated by a long trunk fiber 110. Described in greater detail below, the strength of the optical signal 104 received at the RN 170 may be increased or restored at one or more points between the CO 200 and the RN 170. In some implementations, the strength of the split optical signal 104s is increased at one or more locations between the RN 170 and the user premises 152, 152a-n.

FIG. 2 depicts an example CO 200 which delivers/receives communication signals 104 (e.g., optical signals) to/from one or more Passive Optical Networks (PONs) 10, 10a-n of the optical communication system 100. Examples PONs 10 are discussed above in FIGS. 1A-1C. In the example shown, each PON 10 is served by a corresponding port 124, 124a-n of the OLT 120 installed at the CO 200 of a service provider. One or more OLT ports 124, 124a-n may be optically coupled to a corresponding O/E/O converter 300, 300a-n. In some examples, each OLT port 124 is optically coupled to a corresponding O/E/O converter 300 and each O/E/O converter 300 is optically coupled to a corresponding set of trunk fibers 110, 110a-n (e.g., optical fibers or line-of-sight free space optical communications) which distribute the optical signals 104, 104a1-nN between the O/E/O converters 300 and the remainder of the PONs 10. For instance, in the example shown, each trunk fiber 110, $FT_{a1}$-$FT_{aN}$ in the first set of trunk fibers 110a distributes a corresponding optical signal 104a1-aN between the O/E/O converter 300a and the remainder of the PON 10a; each trunk fiber 110, $FT_{b1}$-$FT_{bN}$ in the second set of trunk fibers 110b distributes a corresponding optical signal 104b1-bN— between the O/E/O converter 300b and the remainder of the PON 10b; and each trunk fiber $FT_{n1}$-$FT_{nN}$ in the n-th set of trunk fibers 110n distributes a corresponding optical signal 104n1-nN between the O/E/O converter 300n and the remainder of the PON 10n. In some examples, the O/E/O converters 300 are installed at the CO 200. The O/E/O converters 300 may be installed at locations remote from the CO 200 as well.

In some implementations, each trunk fiber 110, $FT_{a1}$-$FT_{nN}$ distributes a corresponding optical signal 104 to a respective Remote Node (RN) 170 (FIGS. 1A-1C) associated with a number of users 150. Accordingly, each OLT port 124 is associated with a respective set of trunk fibers 110 and a respective set of RNs 170 serving a respective group of users 150. In some examples, each O/E/O converter 300 receives upstream optical signals 104, 104a1-nN from the remainder of the PON 10 via a corresponding set of trunk fibers 110, combines the received optical signals 104, 104a1-nN into a corresponding combined optical signal 104, 104a-n, and transmits the combined optical signal 104, 104a-n to a corresponding OLT port 124 of the OLT 120.

Figure 3A:
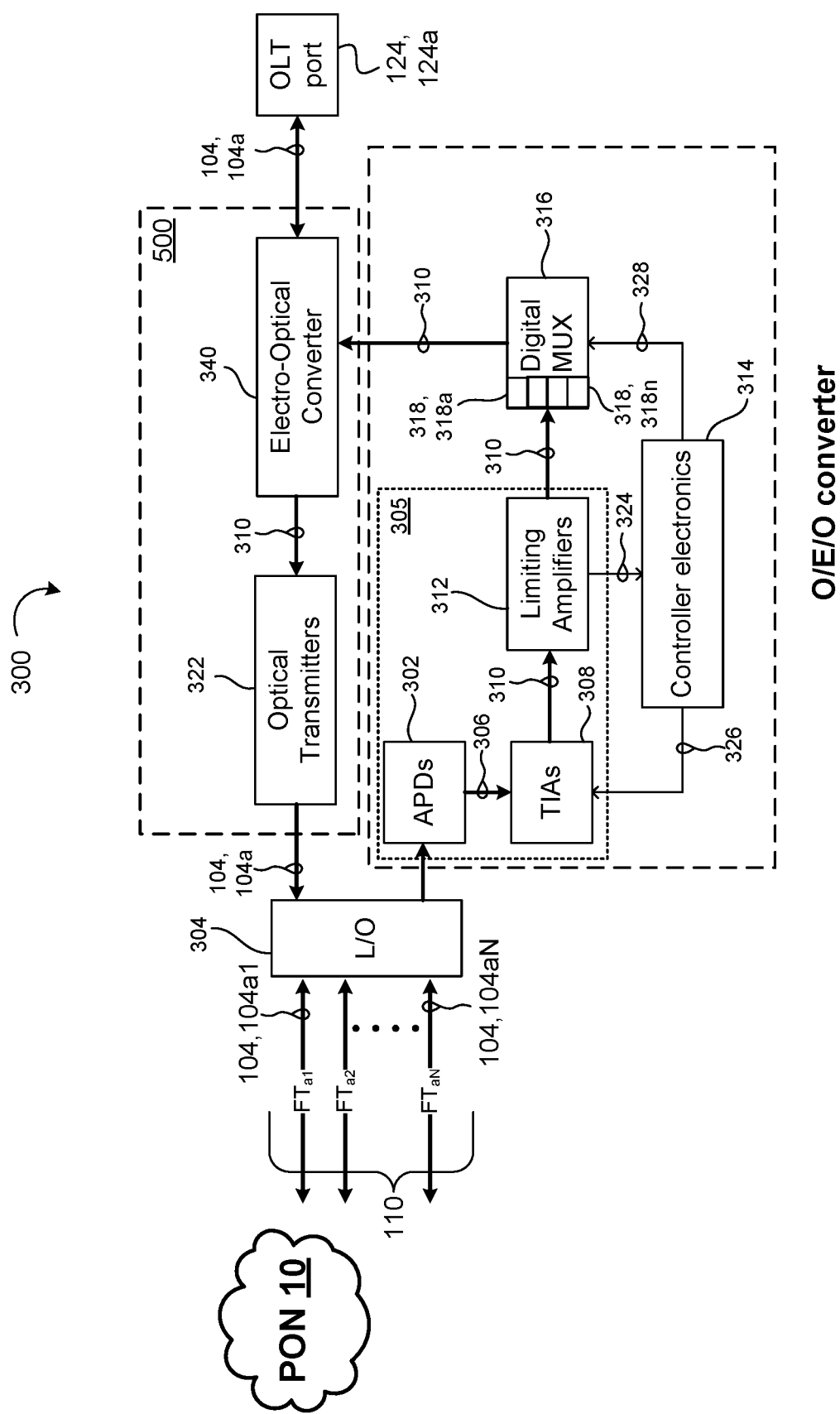
FIG. 3A is a schematic view of an example optical-electrical-optical (O/E/O) converter in communication with a PON.

Referring to FIG. 3A, an example optical-electrical-optical (O/E/O) converter 300 is depicted. The example O/E/O converter 300 is optically coupled to a corresponding OLT port 124 and includes corresponding optical-signal receivers 305 optically coupled to corresponding trunk fibers 110, $FT_{a1}$-$FT_{aN}$. Each corresponding optical-signal receiver 305 may include a photodiode 302 optically coupled to a corresponding one of the trunk fibers 110, a trans-impedance amplifier (TIA) 308 in communication with the photodiode 302, and a burst-mode limiting amplifier 312 in communication with the TIA 308. In some examples, each photodiode 302 is optically coupled, through laser optics (L/O) 304, to the corresponding trunk fiber 110. The photodiodes 302 may include Avalanche Photodiodes (APD) 302 or PIN diodes 302. Other photodetectors may be used as well.

In the example shown, each photodiode 302 (associated with a corresponding optical-signal receiver 305) receives a respective optical signal 104, 104$a$1-aN from the corresponding trunk fiber 110, $FT_{a1}$-$FT_{aN}$ and converts the received optical signal 104 to a respective current signal 306. Thereafter, the corresponding TIA 308 converts the respective current signal 306 to a corresponding electrical signal 310. In an example, the TIA 308 includes a SemTech GN7055B. Other trans-impedance amplifiers may also be used. In some implementations, the photodiodes 302 and TIAs 308 associated with the corresponding optical-signal receivers 305 are replaced with photo-sensors capable of directly producing corresponding electrical signals 310. Accordingly, whether implementing a photodiode-TIA pair 302, 308 or photo-sensors, each corresponding optical-signal receiver 305 is configured to receive the respective optical signal 104 via the corresponding trunk fiber 110 and convert the respective optical signal 104 to the corresponding electrical signal 310. In additional implementations, each corresponding optical-signal receiver 305 is configured to convert the respective optical signal 104 to the corresponding electrical signal 310 when the optical-signal receiver 305 determines the respective optical signal 104 is received. In these implementations, the corresponding burst-mode limiting amplifier 312 may determine when the respective optical signal 104 is received by the corresponding optical-signal receiver 305. In an example, the limiting amplifier 312 includes a SemTech GN7153 configured to output a Signal Detect (SD) indication upon receiving the corresponding electrical signal 310 converted by the corresponding TIA 308. In addition to or in lieu of the limiting amplifier 312, the corresponding photodiode 302 and/or the corresponding TIA 308 may optionally determine when the respective optical signal 104 is received by the corresponding optical-signal receiver 305. Other methods of determining when the respective optical signal 104 is received may also be used. For instance, when the optical-signal receiver 305 implements photosensors in place of the photodiode 302 and the TIA 308, the photosensors may be configured to determine when the respective optical signal 104 is received.

In some examples, the corresponding optical-signal receiver 305 is configured to transmit the corresponding electrical signal 310 to a corresponding input channel 318, 318$a$-$n$ of an electrical-multiplexing device 316 and configure the electrical-multiplexing device 316 to select the corresponding input channel 318, 318$a$-$n$. Here, configuring the electrical-multiplexing device 316 to select the corresponding input channel 318 causes the electrical-multiplexing device 316 to transmit the corresponding electrical signal 310 to an electro-optical converter 340 configured to convert the corresponding electrical signal 310 back to the respective optical signal 104. In some implementations, the electro-optical converter 340 includes a burst-mode laser transmitter that may include a Distributed Bragg Reflector (DBR) laser. Accordingly, the electro-optical converter 340 may include bi-directional optical sub-assemblies (BOSAs) or transmitter optical sub-assemblies (TOSAs). The electro-optical converter 340 may include a XGS-PON BOSA optically coupled to the corresponding OLT port 124. The electro-optical converter 340 may also be in communication with optical transmitters 322 that are optically coupled, via laser optics 304, to the corresponding set of trunk fibers 110 in order to deliver downstream optical signals 104 from the OLT port 124 to the PON 10. Described in greater detail below with reference to FIGS. 5A and 5B, an active optical signal splitter 500 may be used to deliver the downstream optical signals 104 from the OLT port 124 to the corresponding set of trunk fibers 110. In the example shown, the active optical signal splitter 500 includes the electro-optical converter 340 and the optical transmitters 322. As shown in FIG. 5B, the active optical signal splitter 500 may include a passive optical signal splitter 332 in lieu of the optical transmitters 322, the passive optical signal splitter receiving an amplified optical signal 104 from a fiber amplifier 300 optically coupled to the OLT port 124. Other signal splitters 500 may be used as well. In some examples, the corresponding set of trunk fibers 110, 110$a$ are optically coupled to respective burst-mode (BM) transmitters of ONUs 140, located at premises 152 of the users 150.

In some implementations, the O/E/O converter 300 includes a controller circuit 314 (e.g., controller electronics). The controller circuit 314 may be implemented in a Programmable Logic Device (PLD), such as a Complex PLD (CPLD) or a Field Programmable Gate Array (FPGA). The controller circuit 314 may be implemented in other forms, such as discrete logic devices. In the example shown, the optical-signal receiver 305 (e.g., via the corresponding burst-mode limiting amplifier 312) may deliver a signal-received indication 324 to the controller circuit 314 when the respective optical signal 104 is received. For instance, the burst-mode limiting amplifier 312 may deliver signal-received indications 324 to the controller circuit 314 within 25 nanoseconds of the corresponding optical-signal receiver 305 receiving the respective optical signal 104. In some examples, the optical-signal receiver 305 receives the respective optical signal 104 in response to a corresponding burst-mode (BM) transmission from the respective ONU 140. In some implementations, burst-mode limiting amplifiers 312 deliver signal-received indications 324 to the controller circuit 314 only during the burst-mode transmission. The burst-mode limiting amplifiers 312 may cease delivering signal-received indications 324 to the controller circuit 314 within 100 nanoseconds of the end of the burst-mode transmission, i.e., when the O/E/O converter 300 ceases to receive the respective burst-mode optical signal 104, 104$a$1-aN from the respective ONU 140. The signal-received indication 324 may cause the controller circuit to deliver a reset signal 326 to the trans-impedance amplifier 308. The controller circuit 314 may condition or manipulate the signal-received indication 324 to meet requirements of the reset signal 326 to the trans-impedance amplifier 308. In some implementations, the controller circuit 314 delivers a reset signal 326 that is more narrow than the signal-received indication 324 in order to complete the reset of the trans-impedance amplifier 308 more quickly. In an example, the trans-impedance amplifier 308 is reset in about 100 nanoseconds after receiving the respective optical signal 104. The controller circuit 314 may also widen the signal-received indication 324 to meet requirements of the reset signal 326 to the trans-impedance amplifier 308. Described in greater detail below with reference to FIG. 4A, the controller circuit 314 may include a signal-conditioning circuit 400a for converting the signal-received indication 324 to the reset signal 326.

In some implementations, the O/E/O converter 300 configures the electrical-multiplexing device 316 based on the signal-received indication 324. In the example shown, the optical-signal receiver 305 (e.g., via the corresponding burst-mode limiting amplifier 312) delivers a signal-received indication 324 to the controller circuit 314 when the respective optical signal 104 is received. Based on the signal-received indication 324, the controller circuit 314 may deliver a channel-select indication 328 to the electrical-multiplexing device 316 identifying the corresponding input channel 318 of the electrical-multiplexing device 316. The controller circuit 314 may condition or manipulate the signal-received indication 324 to meet requirements of the electrical-multiplexing device 316. In an example, the electrical-multiplexing device 316 includes an ON Semiconductor NB7VQ572M high performance, differential 4:1 multiplexer. In some examples, each of the signal-received indications 324 received at the controller circuit 314 from each of the corresponding optical-signal receivers 305 are logically combined by the controller circuit 314 to produce the channel-select indication 328. The controller circuit 314 may include a channel-select circuit 400b (FIGS. 4B, 4C) that is configured to logically combine signal-received indications 324 to produce the channel-select indication 328. The controller circuit 314 may perform additional housekeeping functions based on the signal-received indication 324, such as resetting or calibrating components at appropriate times to maintain low noise and high signal fidelity.

In an example, within 100-200 nanoseconds of the burst-mode transmission from the ONU 140, the controller circuit 314 resets the trans-impedance amplifier 308 and configures the electrical-multiplexing device 316 to transmit the corresponding electrical signal 310 to the electro-optical converter 340. The electro-optical converter 340 may be configured to convert the corresponding electrical signal 310 back to the respective optical signal 104. The electro-optical converter 340 may deliver the respective optical signal 104 to the corresponding OLT port 124. In some examples, the optical signal 104, 104a includes a preamble pattern at the beginning of the burst-mode transmission. The preamble pattern may be 700-800 nanoseconds long. In additional examples, the OLT port 124, 124a receives the respective optical signal 104, 104a at least 500 nanoseconds before the end of transmission of the preamble pattern from the ONU 140, 140a-n. In other words, the O/E/O converter 300 delivers the respective optical signal 104, 104a to the OLT port 124, 124a without loss of information. In some examples, operation of the O/E/O converter 300 is compatible with and suitable for use with commercially available OLTs 120.

Figure 3B:
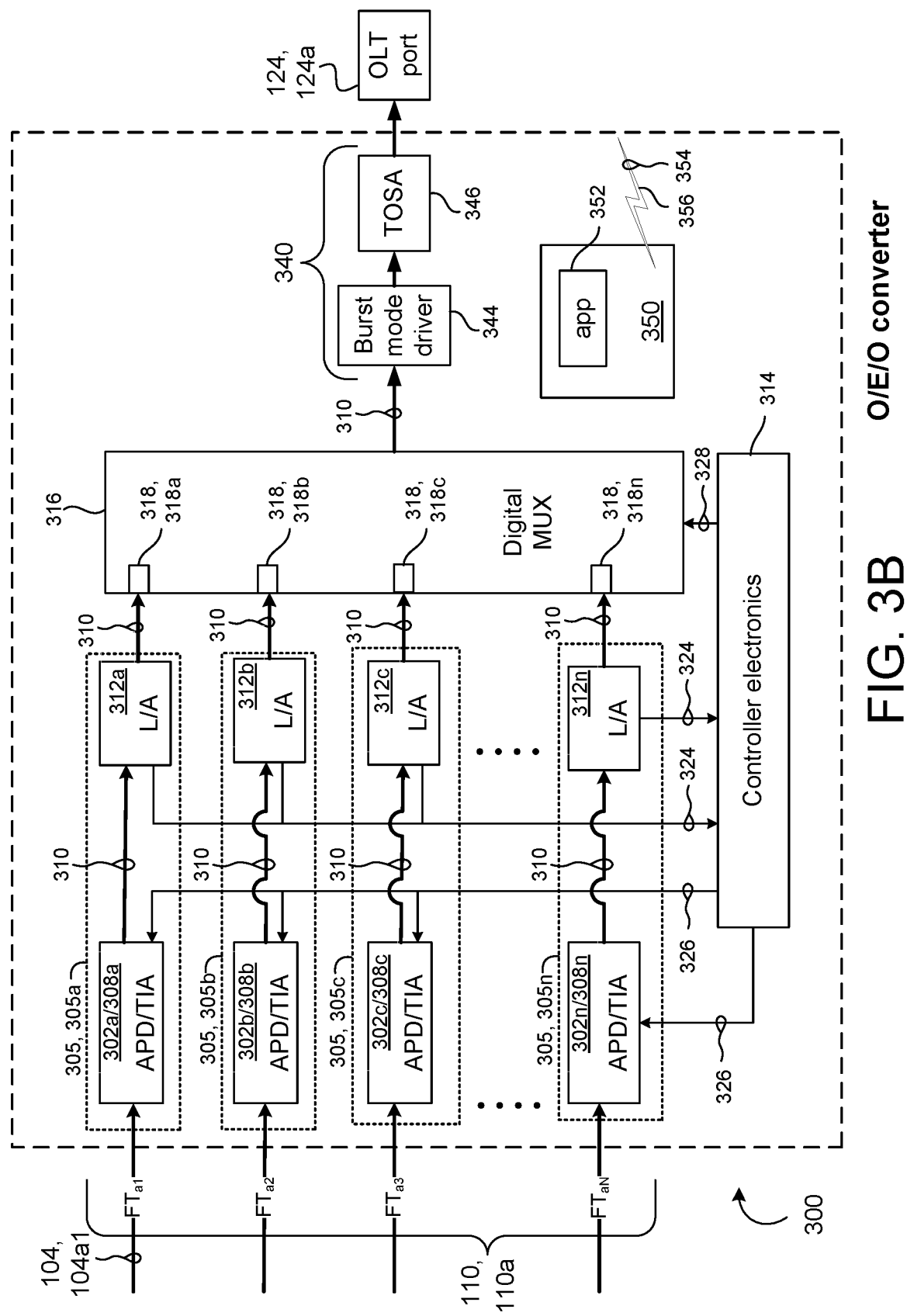
FIG. 3B is a schematic diagram of an example O/E/O converter.

Referring to FIG. 3B, the example O/E/O converter 300 is optically coupled to the corresponding set of trunk fibers 110 to receive respective burst-mode optical signals 104, 104a1-aN via the PON 10 from ONUs 140, 140a-n, located at premises 152, 152a-n of the users 150, 150a-n. In some examples, each trunk fiber 110 is associated with a respective optical-signal receiver 305, 305a-n. In these examples, each optical-signal receiver 305 may include a respective APD 302, 302a-n, a respective TIA 308, 308a-n in communication with the APD 302, and a respective Limiting Amplifier (LA) 312, 312a-n in communication with the TIA 308. Each LA 312 is configured to transmit the corresponding electrical signal 310 to the corresponding input channel 318, 318a-n of the electrical-multiplexing device 316. In the example shown, each LA 312 is configured to deliver a signal-received indication 324 to the controller circuit 314. Based on the signal-received indications 324, the controller circuit 314 may deliver a channel-select indication 328 to the electrical-multiplexing device 316 identifying the corresponding input channel 318 of the electrical-multiplexing device 316. In an example, the channel-select indication 328 identifies the input channel 318 corresponding to the LA 312 delivering a signal-received indication 324 to the controller circuit 314. The channel-select indication 328 may identify the channel 318 corresponding to the highest-priority LA 312 delivering a signal-received indication 324 to the controller circuit 314. Other channel-select indications 328 based on signal-received indications 324 are also possible. The controller circuit 314 may also deliver a reset signal 326 to the TIAs 308.

In some examples, delivering the channel-select indication 328 to the electrical-multiplexing device 316 causes the electrical-multiplexing device 316 to transmit the corresponding electrical signal 310 to the electro-optical converter 340. The electro-optical converter 340 may include a burst-mode (BM) laser driver 344 capable of modulating the signal of a laser transmitter 346. In some examples, an Optical Sub-Assembly (OSA), such as a transmitter OSA (TOSA) or bi-directional OSA (BOSA) includes the laser transmitter 346. In an example, the electro-optical converter 340 includes a 1270 nanometer TOSA 346. Other wavelength laser transmitters 346 may also be used. The laser transmitter 346 may be an Externally Modulated Laser (EML) or a Directly Modulated Laser (DML). The laser transmitter 346 may be optically coupled to OLT port 124, 124a to transmit the respective optical signal 104, 104a to the OLT 120. In some examples, the burst-mode laser transmitter 346 comprises a Distributed Feedback (DFB) laser. Other laser transmitters 346 may be used as well.

The O/E/O converter 300 may be installed at the CO 200 (FIGS. 1A-1C). In some examples, the components of the O/E/O converter 300 are mounted on a Printed Circuit Board (PCB) and contained within a rack-mountable enclosure installed at the CO 200 or other convenient location. In some examples, the O/E/O converter 300 is installed at the RN 170 or at or near premises 152, 152a-n of the users 150, 150a-n. Remote installation of the O/E/O converter 300 may extend the reach of the OLT port 124. In some examples, the O/E/O converter 300 is optically coupled to more than one OLT port 124 to provide redundancy for increased PON reliability. Redundant OLT ports 124 may be located at more than one CO 200 to avoid common-mode failures such as loss of electrical power to the OLT 120. The O/E/O converter 300 may be remotely configurable. In some examples, the O/E/O converter 300 includes data processing hardware 350 (e.g., processor(s) and/or controller(s)) and memory hardware 352 in communication with the data processing hardware 350 and storing instructions that when executed by the data processing hardware 350 cause the data processing hardware 350 to execute a software application 352. The data processing hardware 350 may receive messages 354 transmitted over a communication 356 network. The messages 354 may instruct the data processing hardware 350 to reconfigure the O/E/O converter 300. The data processing hardware 350 may selectively enable, disable, or otherwise configure or reprovision individual trunk fibers 110 or change the communication wavelength of an optical signal 104. In an example, the data processing hardware 350 responds to messages 354 that include Simple Network Management Protocol (SNMP) commands 354 transmitted from the CO 200 via the communications channel 356. In the case of failure of one OLT port 124, the data processing hardware 350 may configure the O/E/O converter 300 to switch to an operating OLT port 124. In an example, the operating OLT port 124 is associated with a different CO 200 than the failed OLT port 124. In some examples, the data processing hardware 350 selectively enables/disables signals to/from the controller electronics 314.

Figure 4A:
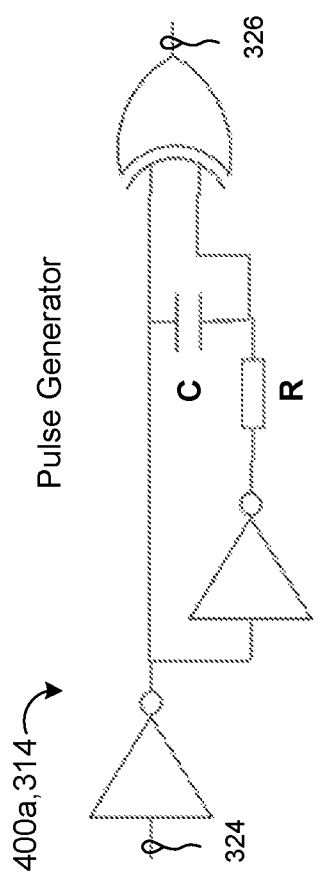
FIG. 4A-4C are schematic diagrams of O/E/O converter controller circuits.

Referring to FIG. 4A, an example signal-conditioning circuit 400a of the controller circuit 314 of FIGS. 3A and 3B is depicted. In the example shown, the signal-conditioning circuit 400a includes a pulse generator configured to generate a reset signal 326 based on the signal-received indication 324 and deliver the reset signal 326 to the TIA 308. Here, the circuit 400a includes at least one signal inverter, a parallel arrangement of a resistor R and a capacitor C, and an exclusive OR logic gate. In some examples, the controller circuit 314 delivers a reset signal 326 that is more narrow than the signal-received indication 324 in order to complete the reset of the TIA 308 more quickly. The width of the reset signal 326 may be based on the charging time of the capacitor C. The charging time may be based on the resistance of the resistor R and the capacitance of the capacitor C. In an example, values for R and C produce a 10 nanosecond wide reset signal 326. Other signal-conditioning circuits 314, including signal inverters, delay circuits, and pulse stretchers may be used as well.

Figure 4B:
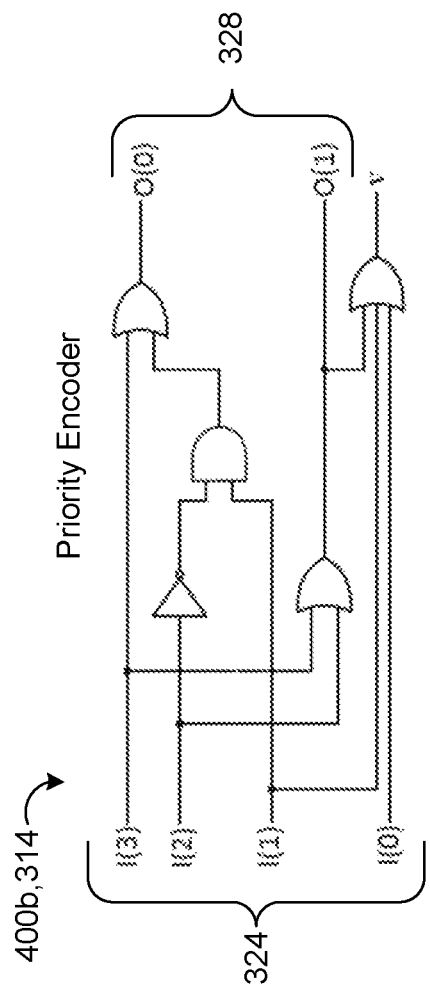

Referring to FIG. 4B, an example priority-encoder circuit 400b of the controller circuit 314 of FIGS. 3A and 3B is depicted. In the example shown, inputs to the priority-encoder circuit 400b are depicted I(0)-I(3). Here, each input corresponds to a signal-received indication 324 from a limiting amplifier 312. Each signal-received indication 324 corresponds with a respective MUX input channel. Outputs from the priority-encoder circuit 400b are depicted O(0) and O(1). In the example shown, the channel-select circuit 400b includes a priority-encoder circuit configured to generate, based on the signal-received indication 324, the channel-select indication 318 for configuring the electrical-multiplexing device 316 to select the corresponding input channel 318. For instance, the priority-encoder circuit 400b may condition or manipulate the signal-received indication 324 to meet requirements for configuring the electrical-multiplexing device 316. In an example, using AND, OR, and NOT gates, the priority-encoder circuit logically combines four signal-received indications 324 to produce a two-bit channel-select indication 328 and a validity signal V. The example circuit assigns the highest priority to the input channel 318 corresponding to input I(3) and the lowest priority to the input channel 318 corresponding to input I(0). The two-bit channel-select indication 328 encodes the number (0-3) of the highest priority input channel 318 associated with a signal-received indication 324. In an example, the channel-select indication 328 encodes the decimal value three (binary 11) when input channel 318, corresponding with I(3), is associated with a signal-received indication 324. Table 1 below shows the relationship between the inputs and outputs. The symbol X is used to denote an input having a state that is immaterial to the output.

TABLE 1

| Inputs | | | | Outputs | | |
|---|---|---|---|---|---|---|
| I(3) | I(2) | I(1) | I(0) | O(1) | O(0) | V |
| 1 | X | X | X | 1 | 1 | 1 |
| 0 | 1 | X | X | 1 | 0 | 1 |

TABLE 1-continued

| Inputs | | | | Outputs | | |
|---|---|---|---|---|---|---|
| I(3) | I(2) | I(1) | I(0) | O(1) | O(0) | V |
| 0 | 0 | 1 | X | 0 | 1 | 1 |
| 0 | 0 | 0 | 1 | 0 | 0 | 1 |
| 0 | 0 | 0 | 0 | 0 | 0 | 0 |

Figure 4C:
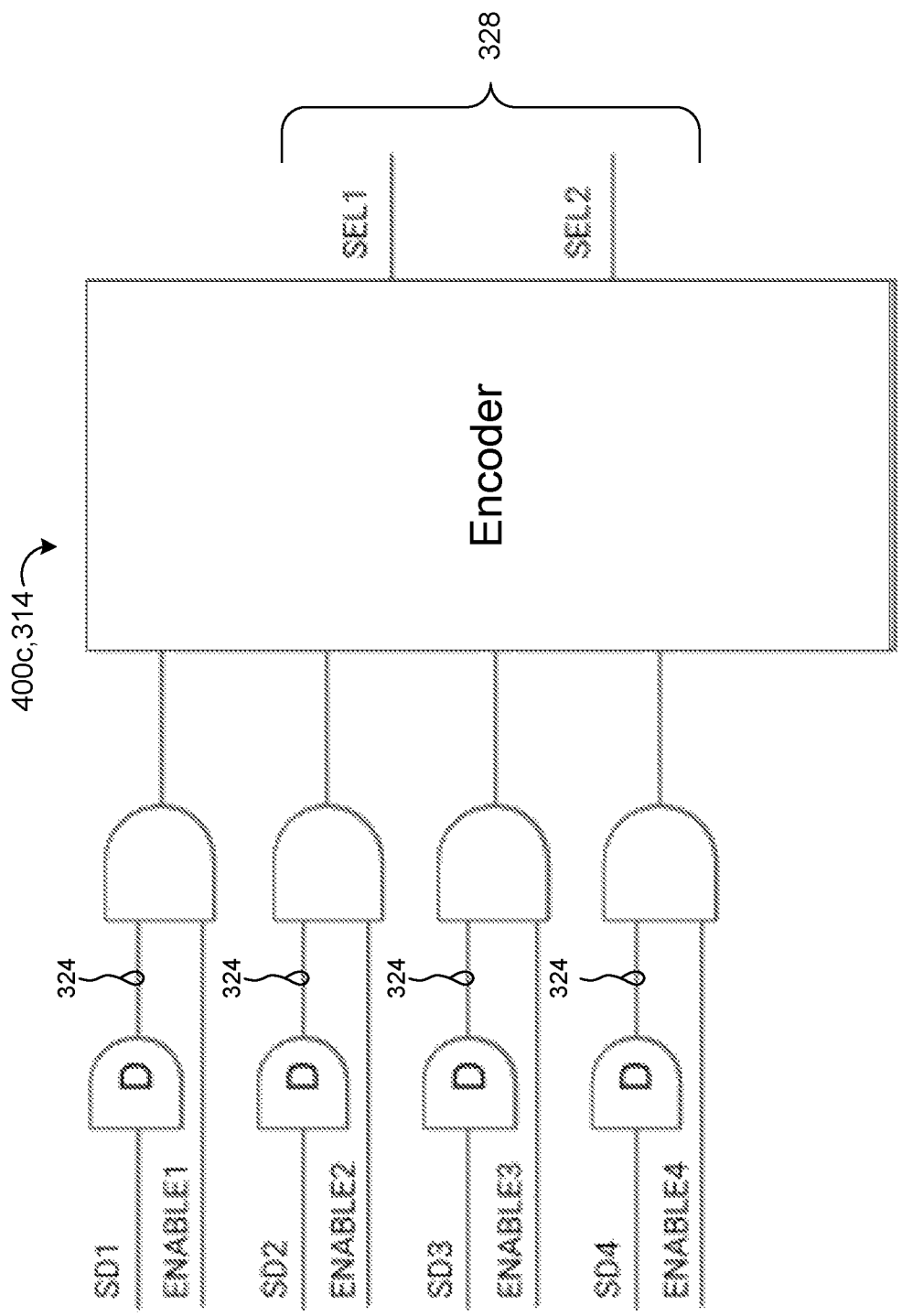

In some examples, only one ONU 140, 140a-n transmits a burst-mode optical signal 104 at a time. In this case, only one signal-received indication 324 is received by the priority-encoder circuit 400b at a time. The priority-encoder circuit 400b may encode the number of the corresponding input channel 318 of the electrical-multiplexing device 316 that is associated with the signal-received indication 324. The validity signal V indicates when a signal-received indication 324 is received by the priority-encoder circuit 400b. In some examples, the priority-encoder circuit 400b delivers the validity signal V to the electrical-multiplexing device 316 to signal the electrical-multiplexing device 316 to select the corresponding input channel 318 encoded by the priority-encoder circuit 400b. The controller circuit 314 may include additional logic or other circuitry. In an example, the controller circuit 314 includes additional logic configurable to selectively enable or disable inputs to the priority-encoder circuit 400b of the controller circuit 314. The controller circuit 314 may widen, narrow, or invert input signals as well. FIG. 4C depicts another priority-encoder circuit 400c, 314 including additional AND gates configured to selectively enable signal-received indications 324. Here, enable signals, depicted ENABLE1-ENABLE4, may selectively mask off or disable corresponding signal-received indications 324, so that the corresponding signal-received indications 324 have no effect on the priority-encoder circuit 400b. In some examples, signal-received indications 324 are disabled unless a corresponding enable signal is asserted. Selectively enabling channels may be used to support redundant OLT ports 124 for increased reliability.

Figure 5A:
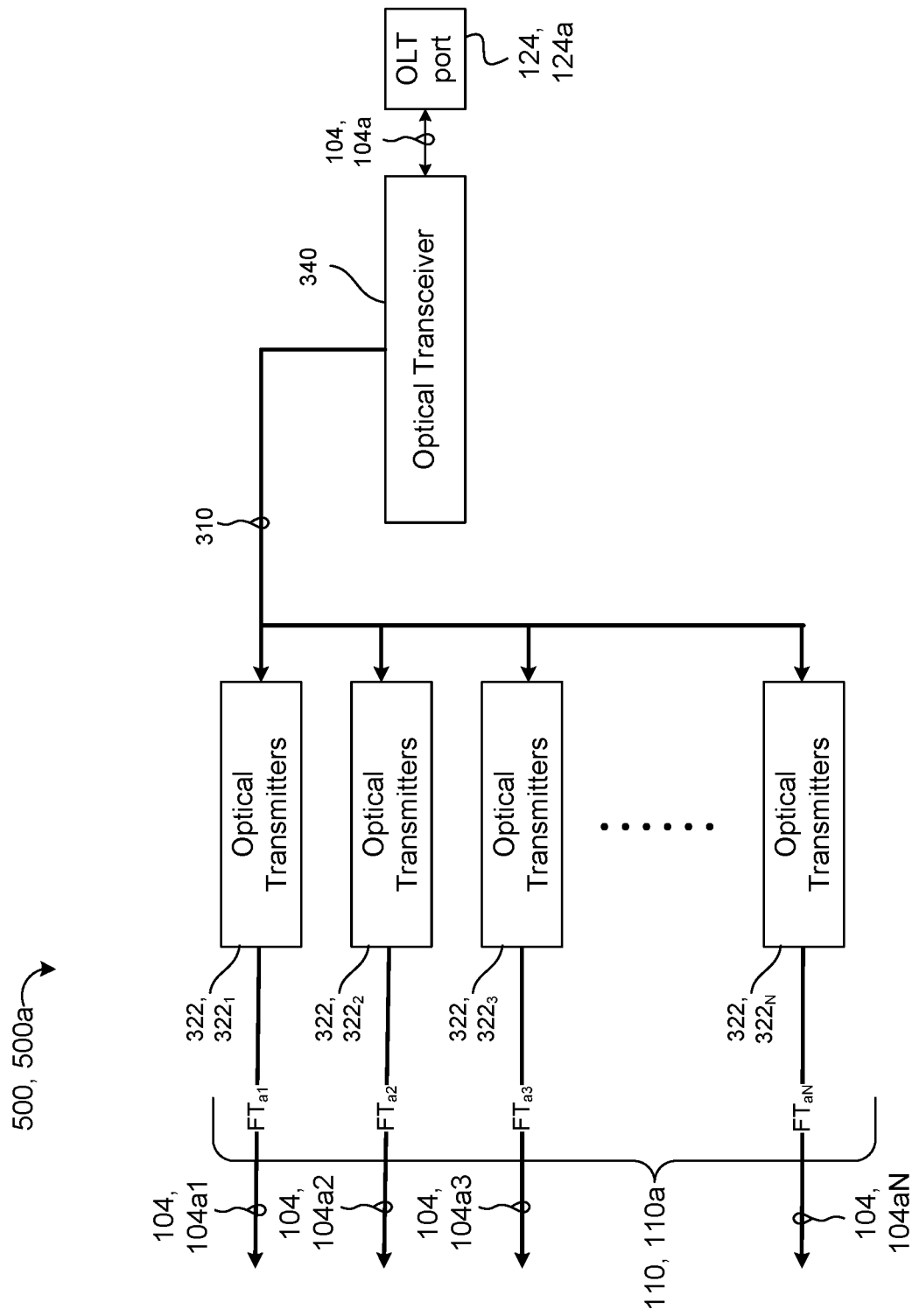
FIGS. 5A and 5B are schematic diagrams of example optical signal splitters.
Figure 5B:
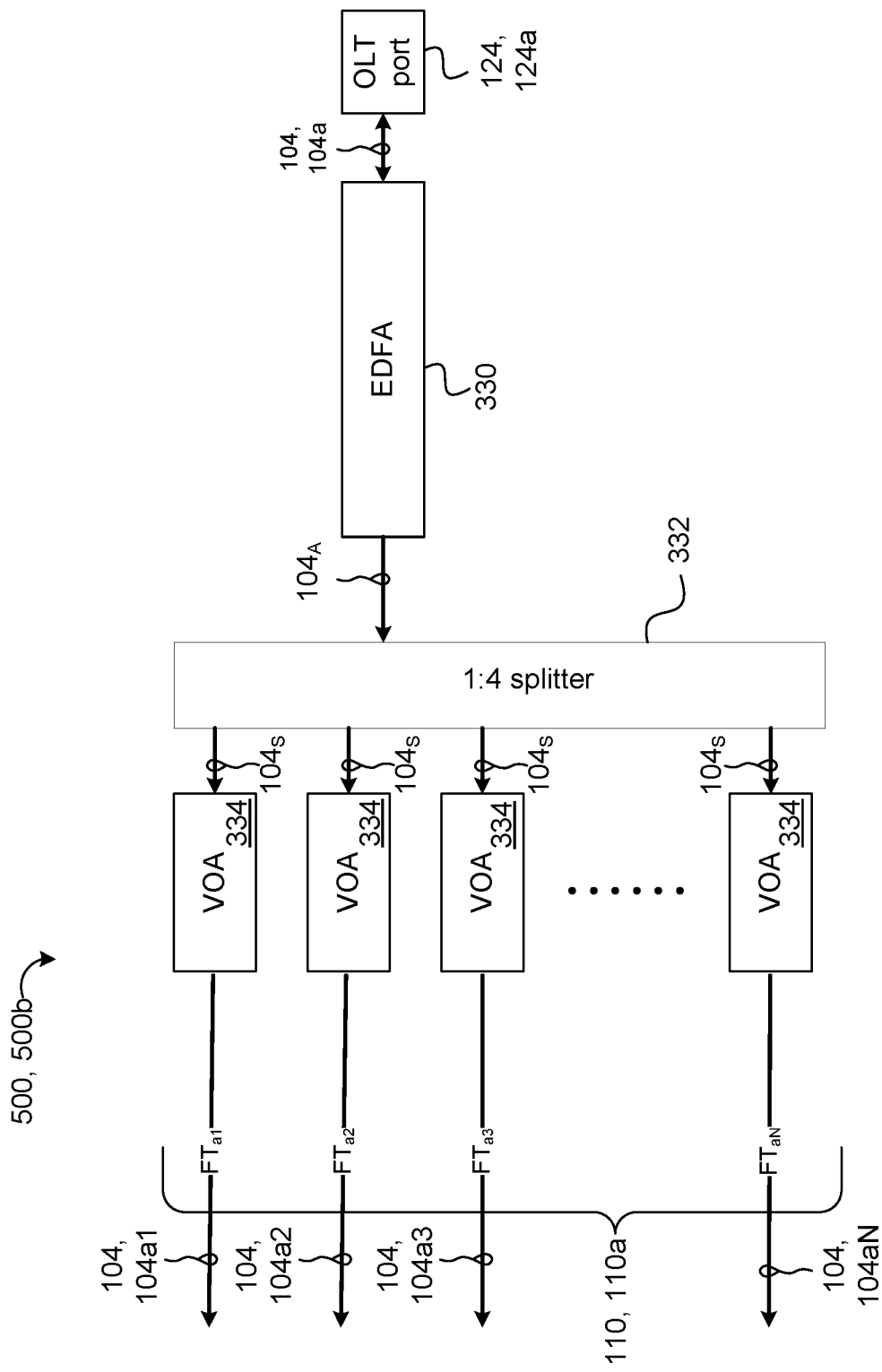

Referring to FIG. 5A, an active optical signal splitter 500, 500a is depicted. Here, the active optical signal splitter 500a converts the downstream optical signal 104 from the OLT port 124, 124a to a corresponding electrical signal 310, duplicates the corresponding electrical signal 310, and restores each duplicate corresponding electrical signal to a duplicate of the optical signal 104. The active optical splitter 500a of FIG. 5A may be referred to as an optical/electrical/optical (O/E/O) splitter. In the example shown, the OLT port 124, 124a is optically coupled to an optical transceiver 340 in communication with optical transmitters 322, $322_{1-N}$. The optical transceiver 340 may be a laser transceiver of an Optical Sub-Assembly (OSA), such as a receiver OSA (ROSA) or bi-directional OSA (BOSA). The optical transmitters 322 may be optically coupled to the corresponding set of trunk fibers 110, 110a in order to deliver downstream optical signals 104, 104a1-aN from the OLT port 124, 124a. In some examples, the optical transceiver 340 receives the downstream optical signal 104, 104a to be transmitted from the OLT port 124, 124a in Continuous Mode (CM), converts the optical signal 104, 104a to a corresponding electrical signal 310, and delivers copies/duplicates of the corresponding electrical signal 310 to each optical transmitter 322, $322_{1-N}$. Each optical transmitter 322 is configured to convert the corresponding electrical signal 310 back to the optical signal 104, 104a and transmit the optical signal 104 to the corresponding ONUs 140 via the corresponding trunk fiber 110. In an example, the optical transmitter 322 includes a 1577 nanometer TOSA. Other wavelength optical transmitters 322 may also be used. The optical transmitter 322 may include Externally Modulated Laser (EML) or a Directly Modulated Transmitter (DML). In an example, the optical transmitter 322 includes an AST-EML-1577-10G-L600-V1 distributed-feedback (DFB) laser diode with integrated Electro-Absorption Modulator (EAM), providing a single longitudinal mode at 1577 nm.

In some examples, the active optical signal splitter 500a extends the reach of the corresponding OLT port 124 by increasing or restoring the optical signal strength transmitted from the OLT port 124 to a remote location. In some examples, the optical power output of each optical transmitter 322, $322_1$-$322_N$ is substantially equal to the optical power output of the OLT port 124, 124a. Thus, each optical transmitter 322 may transmit a respective optical signal 104, 104a1-aN, via a corresponding trunk fiber 110, $FT_{a1}$-$FT_{aN}$, which is a substantial copy/duplicate of the originating optical signal 104, 104a output from the OLT port 124, 124a at substantially the same optical power level. In other words, unlike a passive optical splitter, the power of the optical signal 104, 104a transmitted by the OLT port 124, 124a is not divided, split, or shared between each optical signal 104 distributed by the respective trunk fibers $FT_{a1}$-$FT_{aN}$.

Referring to FIG. 5B, another active optical signal splitter 500,500b is depicted. By contrast to the O/E/O approach implemented by the active optical signal splitter 500a of FIG. 5A, the active optical signal splitter 500b splits the downstream optical signal 104 from the OLT port 124, 124a using active optical components rather than converting the optical signal 104 to a corresponding electrical signal 310. In the example shown, the active optical signal splitter 500b includes a passive optical splitter 332 and an optical amplifier 330 in lieu of optical transceivers 340. The optical amplifier 330 may include a powered, or active, optical amplifier. Here, the optical amplifier 330 receives the optical signal 104 from the OLT port 124 and outputs an amplified optical signal $104_A$. The optical amplifier 330 may include an Erbium-Doped Fiber Amplifier (EDFA). For instance, the optical amplifier 330 may include an L-band EDFA. However, other wavelength optical amplifiers 330 may also be used. In the example shown, the OLT port 124, 124a is optically coupled to the optical amplifier 330. The optical amplifier 330 is used to pump, increase the power of, or otherwise amplify the strength of the optical signal 104 transmitted from the OLT port 124, 124a to produce the amplified optical signal $104_A$. The amplified optical signal $104_A$ is transmitted to the passive optical splitter 332 optically coupled to the optical amplifier 330. In an example, the passive optical splitter 332 is a 1:4 splitter. In other words, the optical splitter 332 splits the amplified optical signal $104_A$ into four split optical signals $104_S$. In some examples, each optical signal $104_S$ split by the passive optical splitter 332 includes one quarter the power of the amplified optical signal 104 received by the passive optical splitter 332. In some configurations, the optical amplifier 330 is configured to amplify the optical signal 104 output from the OLT port 124 by a magnitude proportional to the splitting ratio of the splitter 332. For instance, when the splitter 332 includes the 1:4 splitter, the optical amplifier 330 may increase the power level of the optical signal 104 output from the OLT port 124 by a magnitude of four (4). Other splitter configurations may be used as well. In other examples, the optical signal 104 is optically split by the splitter 332 before being pumped by respective fiber amplifiers 330. For instance, the 1:4 passive optical splitter 332 may be directly optically coupled to the OLT port 124a to receive and split the downstream optical signal 104a into four split optical signals $104_S$, whereby a respective fiber amplifier 330 amplifies each respective split optical signal $104_S$ output from the splitter 332. Here, each respective fiber amplifier 330 may amplify each respective split optical signal $104_S$ by a magnitude proportional to the splitting ratio of the splitter 332. Other configurations of active and passive optical elements may also be used.

In some examples, the splitter 332 (or respective amplifiers 330 when the splitter 332 is upstream of amplification) transmits the split optical signal 104, $104_S$ to a corresponding Variable Optical Amplifier (VOA) 334. Each corresponding VOA 334 may control the power level of the optical signal 104 transmitted on each respective trunk fiber $FT_{a1}$-$FT_{aN}$. In an example, the VOAs 334 enable or disable transmission of the optical signals 104, 104a1-aN transmitted on each respective trunk fiber $FT_{a1}$-$FT_{aN}$. Either of the active optical signal splitters depicted in FIGS. 5A and 5B may be used in conjunction with the O/E/O converter 300. In other words, both the optical design and the O/E/O design are compatible with the O/E/O converter 300. Other configurations of active optical signal splitters are also possible.

Figure 6:
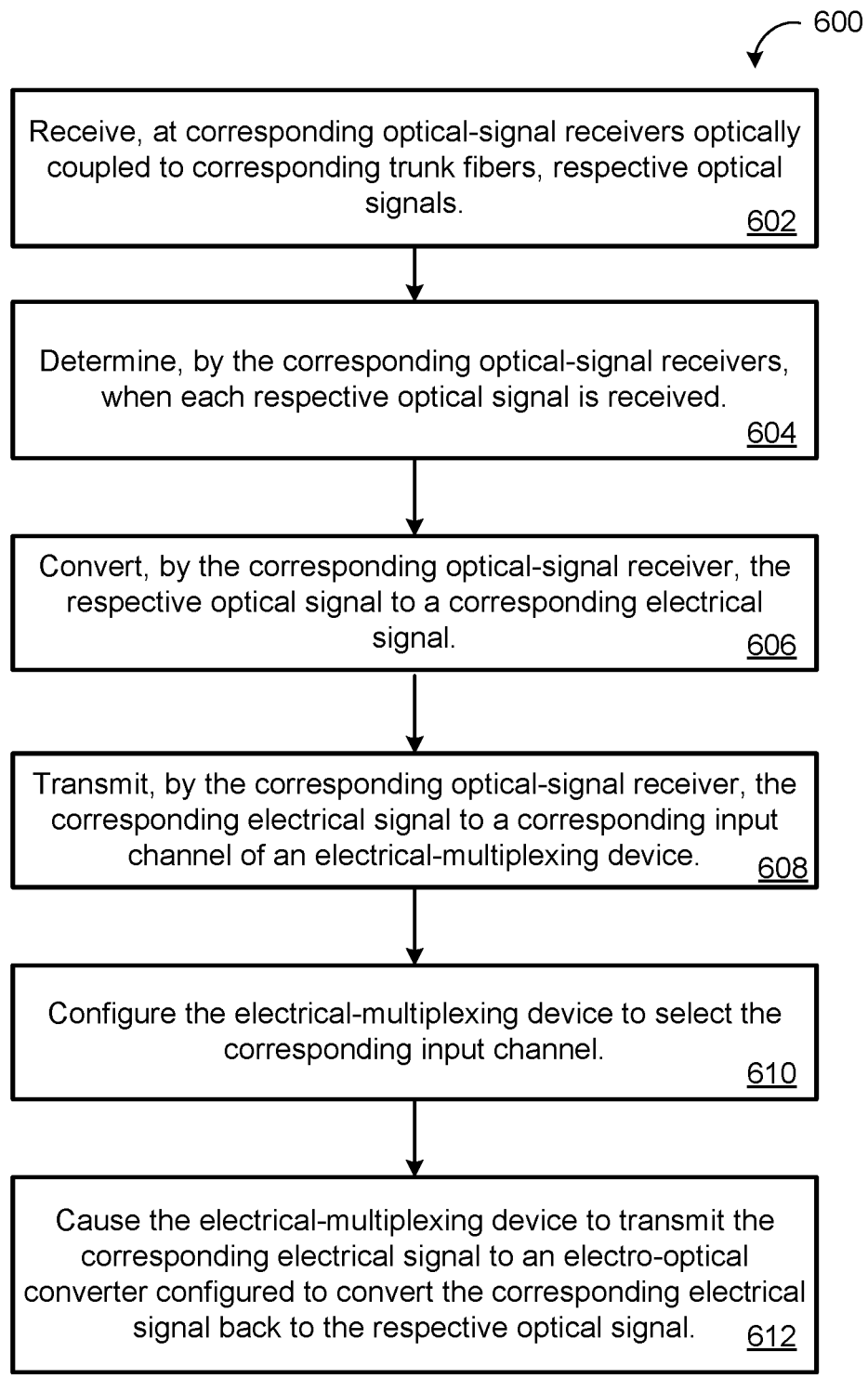
FIG. 6 is a flowchart of an example arrangement of operations for a method of combining optical signals from optical fibers into a single optical signal.

FIG. 6 provides an example arrangement of operations for a method 600 of combining optical signals from trunk fibers into an optical signal. At operation 602, the method 600 includes receiving, at corresponding optical-signal receivers 305 optically coupled to corresponding trunk fibers 110, respective optical signals 104. At operation 604, the method 600 includes determining, by the corresponding optical-signal receivers 305, when each respective optical signal 104 is received. At operation 606, the method 600 includes converting, by the corresponding optical-signal receiver 305, the respective optical signal to a corresponding electrical signal 310. At operation 608, the method 600 includes transmitting, by the corresponding optical-signal receiver 305, the corresponding electrical signal 310 to a corresponding input channel 318 of an electrical-multiplexing device 316. At operation 610, the method 600 includes configuring the electrical-multiplexing device 316 to select the corresponding input channel 318. At operation 612, the method 600 includes causing the electrical-multiplexing device 316 to transmit the corresponding electrical signal 310 to an electro-optical converter 340 configured to convert the corresponding electrical signal 310 back to the respective optical signal 104.

A number of implementations have been described. Nevertheless, it will be understood that various modifications may be made without departing from the spirit and scope of the disclosure. Accordingly, other implementations are within the scope of the following claims.

What is claimed is:
1. A method comprising:
receiving, at corresponding optical-signal receivers optically coupled to corresponding trunk fibers, respective optical signals;
for each corresponding optical-signal receiver:
determining, by the corresponding optical-signal receiver, when the respective optical signal is received;
responsive to determining when the respective optical signal is received, delivering, by a bust-mode limiting amplifier of the corresponding optical-signal receiver, a reset signal to a signal-conditioning circuit, causing the signal-conditioning circuit to reset a trans-impedance amplifier of the corresponding optical-signal receiver, the signal-conditioning cir- cuit comprising a Complex Programmable Logic Device (CPLD) or a Field Programmable Gate Array (FPGA);

converting, by the corresponding optical-signal receiver, the respective optical signal to a corresponding electrical signal;

transmitting, by the corresponding optical-signal receiver, the corresponding electrical signal to a corresponding input channel of an electrical-multiplexing device; and configuring the electrical-multiplexing device to select the corresponding input channel, causing the electrical-multiplexing device to transmit the corresponding electrical signal to an electro-optical converter configured to convert the corresponding electrical signal back to the respective optical signal.

2. The method of claim 1, wherein each corresponding optical-signal receiver comprises:

a photodiode optically coupled to a corresponding trunk fiber, the photodiode converting the respective optical signal to a respective current signal;

the trans-impedance amplifier in communication with the photodiode, the trans-impedance amplifier converting the respective current signal to the corresponding electrical signal; and the burst-mode limiting amplifier in communication with the trans-impedance amplifier, the burst-mode limiting amplifier indicating when the respective optical signal is received.

3. The method of claim 2, wherein the photodiode comprises an avalanche photodiode or a PIN diode.

4. The method of claim 1, wherein configuring the electrical-multiplexing device to select the corresponding input channel comprises delivering, by the corresponding optical-signal receiver, a signal detection indication to a channel-select circuit, causing the channel-select circuit to deliver a channel-select indication to the electrical-multiplexing device, the channel-select indication identifying the corresponding input channel of the electrical-multiplexing device.

5. The method of claim 1, wherein the electro-optical converter comprises a burst-mode laser transmitter.

6. The method of claim 5, wherein the burst-mode laser transmitter comprises a Distributed Bragg Reflector (DBR) laser.

7. The method of claim 1, further comprising delivering, by the electro-optical converter, the respective optical signal to a port of an optical line terminal (OLT).

8. The method of claim 1, wherein the corresponding trunk fibers are optically coupled to respective burst-mode laser transmitters of respective Optical Network Units (ONUs).

9. An optical-electrical-optical converter comprising:

an electrical-multiplexing device comprising one or more input channels; and optical-signal receivers optically coupled to corresponding trunk fibers, each optical-signal receiver configured to:

receive a respective optical signal from the corresponding trunk fiber;

determine when the respective optical signal is received;

responsive to determining when the respective optical signal is received, deliver, by a bust-mode limiting amplifier of the corresponding optical-signal receiver, a reset signal to a signal-conditioning circuit, causing the signal-conditioning circuit to reset a trans-impedance amplifier of the corresponding optical-signal receiver, the signal-conditioning circuit comprising a Complex Programmable Logic Device (CPLD) or a Field Programmable Gate Array (FPGA);

convert the respective optical signal to a corresponding electrical signal;

transmit the corresponding electrical signal to a corresponding input channel of the electrical-multiplexing device; and configure the electrical-multiplexing device to select the corresponding input channel, causing the electrical-multiplexing device to transmit the corresponding electrical signal to an electro-optical converter configured to convert the corresponding electrical signal back to the respective optical signal.

10. The optical-electrical-optical converter of claim 9, wherein each corresponding optical-signal receiver comprises:

a photodiode optically coupled to a corresponding trunk fiber, the photodiode converting the respective optical signal to a respective current signal;

the trans-impedance amplifier in communication with the photodiode, the trans-impedance amplifier converting the respective current signal to the corresponding electrical signal; and the burst-mode limiting amplifier in communication with the trans-impedance amplifier, the burst-mode limiting amplifier indicates when the respective optical signal is received.

11. The optical-electrical-optical converter of claim 10, wherein the photodiode comprises an avalanche photodiode or a PIN diode.

12. The optical-electrical-optical converter of claim 9, wherein configuring the electrical-multiplexing device to select the corresponding input channel comprises delivering, by the corresponding optical-signal receiver, a signal detection indication to a channel-select circuit, causing the channel-select circuit to deliver a channel-select indication to the electrical-multiplexing device, the channel-select indication identifying the corresponding input channel of the electrical-multiplexing device.

13. The optical-electrical-optical converter of claim 9, wherein the electro-optical converter comprises a burst-mode laser transmitter.

14. The optical-electrical-optical converter of claim 13, wherein the burst-mode laser transmitter comprises a Distributed Bragg Reflector (DBR) laser.

15. The optical-electrical-optical converter of claim 9, further comprising delivering, by the electro-optical converter, the respective optical signal to a port of an optical line terminal (OLT).

16. The optical-electrical-optical converter of claim 9, wherein the corresponding trunk fibers are optically coupled to respective burst-mode laser transmitters of respective Optical Network Units (ONUs).

* * * * *